United States Patent [19]

Lerminiaux et al.

[11] Patent Number: 5,539,847
[45] Date of Patent: Jul. 23, 1996

[54] INTEGRATED OPTICAL COUPLER WITH ONE INPUT PORT AND $2^N$ OUTPUT PORTS

[75] Inventors: Christian Lerminiaux, Fontainebleau; Denis M. Trouchet, Quincy-sous-Senart, both of France

[73] Assignee: Corning Incorporated, Corning, N.Y.

[21] Appl. No.: 390,857

[22] Filed: Feb. 17, 1995

[51] Int. Cl.$^6$ ................................................. G02B 6/26
[52] U.S. Cl. ............................ 385/45; 385/14; 385/50
[58] Field of Search ............................ 385/14, 39, 16, 385/17, 20, 21, 22, 24, 48, 50, 129, 132

[56] References Cited

U.S. PATENT DOCUMENTS

| | | | |
|---|---|---|---|
| 4,760,580 | 7/1988 | Thompson et al. | 385/45 |
| 5,222,167 | 6/1993 | Jean et al. | 385/45 |
| 5,226,100 | 7/1993 | Maerz | 385/45 |
| 5,233,453 | 8/1993 | Savarajan et al. | 385/45 |
| 5,311,604 | 5/1994 | Rogner et al. | 385/14 |
| 5,394,489 | 2/1995 | Koch | 385/14 |

FOREIGN PATENT DOCUMENTS

| | | | |
|---|---|---|---|
| 0513556A1 | 4/1992 | European Pat. Off. | 6/12 |
| 0527425A1 | 8/1992 | European Pat. Off. | 6/12 |
| 2676548 | 11/1992 | France . | |
| 2231412 | 11/1990 | United Kingdom | 6/10 |
| WO90/11541 | 10/1990 | WIPO | 6/28 |

*Primary Examiner*—John Ngo
*Attorney, Agent, or Firm*—Mark W. Lauroesch

[57] ABSTRACT

The present invention relates to a coupler having one input port and $2^n$ output ports which includes a plurality of essentially coplanar waveguides connecting the input port to one of the $2^n$ output ports. The plurality of waveguides are arranged in two symmetrical groups in relation to the axis of the coupler and have points of inflection. Each of the waveguides includes branches connected in a tree-like manner by n levels of Y-junctions where the waveguides connecting at least two of the output ports that are located furthest from the axis of the coupler to the input port have no singularities and between the first level and the nth level of the Y-junction have points of inflection located outside the junctions. Further, the junctions located along these waveguides have axes of symmetry which are not parallel to the axis of the coupler. The waveguides connecting at least two of the output ports that are located closest to the axis of the coupler have junctions in the (n−1)th level having axis of symmetry parallel to the axis of the coupler, with the axis of each of these junctions defining an axis of symmetry for two junctions in the nth level and which are likewise parallel to the axis of the coupler, and also for the four output points that they feed.

4 Claims, 1 Drawing Sheet

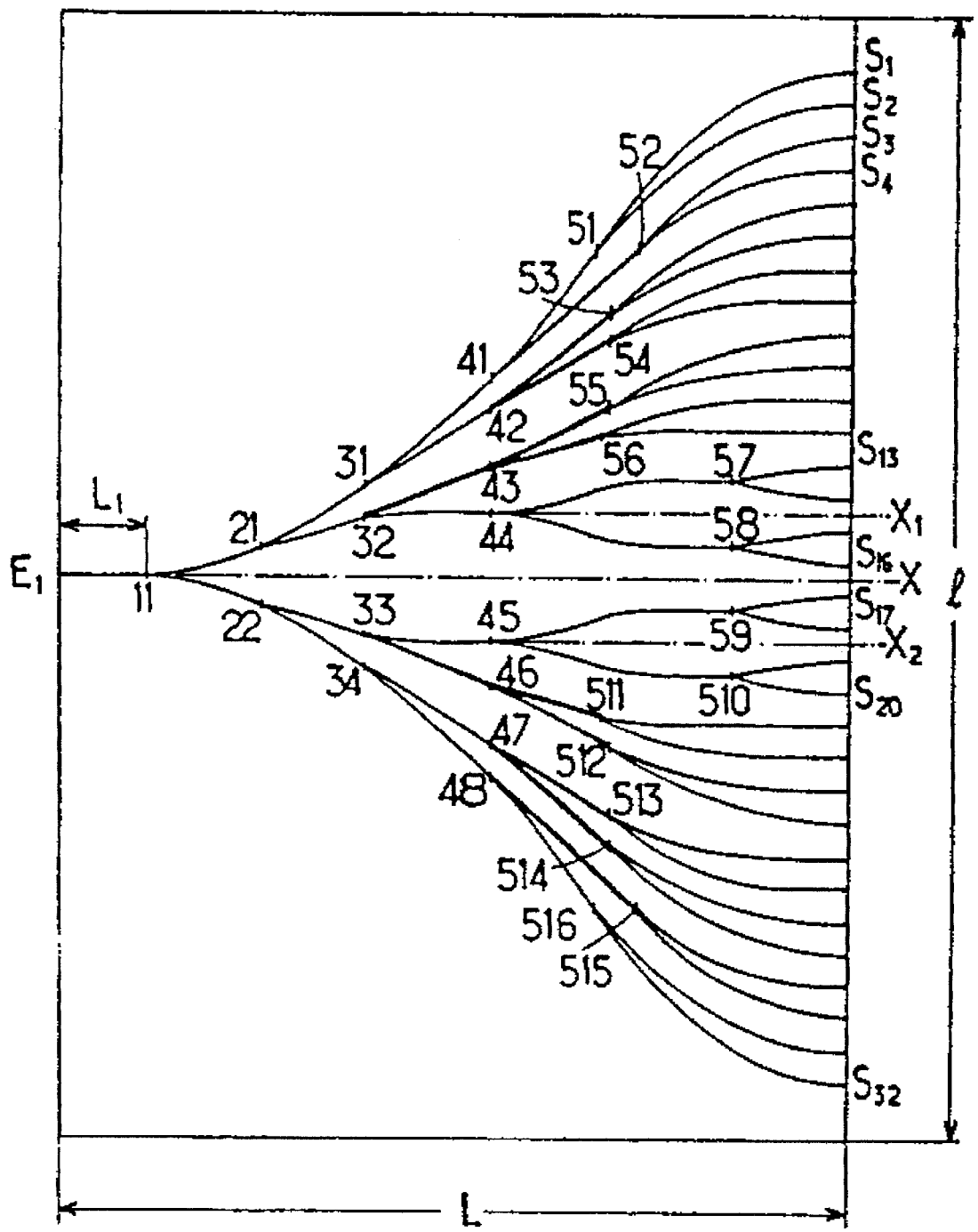

INTEGRATED OPTICAL COUPLER WITH ONE INPUT PORT AND $2^N$ OUTPUT PORTS

FIELD OF THE INVENTION

The present invention relates to an integrated optical coupler with one input port and $2^n$ output ports and, more specifically, to such a coupler that includes a plurality of coplanar waveguides that are arranged in two symmetrical groups in relation to the axis of the coupler and that consist of waveguide branches that are connected in a tree-like manner by means of n levels of Y-junctions.

BACKGROUND OF THE INVENTION

A coupler of this type is known, as described in French patent No. 2,676,548, filed under the name of the present applicant (corresponding to U.S. Pat. No. 5,222,167). According to the teachings of this document, the amount of axial space required by the coupler is limited through the elimination of all points of inflection on the guides except at locations where they are necessary, i.e., at the junctions. In this way it was possible to create a coupler with 16 outputs and a reduced space requirement that nevertheless met the necessary specifications in terms of the uniformity of the distribution of the light power transmitted to the various output ports, and in terms of achromaticity in the two wavelength domains used in fiber-optic telecommunications.

However, when the type of waveguide-pattern design rules described in the above-mentioned patent are used to create a coupler with a larger number of output ports, such as 32, difficulties are encountered in terms of meeting the specifications. These difficulties fall into two basic classes.

First, the pattern in question consists only of concave waveguide branches. In order to create a coupler with 32 output ports, obviously the number of branches must be multiplied, with a resulting loss of accrued curvature. It is also known that, particularly with single-mode waveguides, concave branches cause mode misalignments that are unfavorable to a balanced distribution of the light power between the two output branches of a junction.

Second, the pattern consists essentially of Y-junctions whose axes are inclined in relation to the axis of the coupler. This arrangement also involves an arrangement which, when the number of junctions increases, is unfavorable to the uniformity of the distribution of the light power among the various outputs. In fact, in the classical procedure, the waveguides in the coupler are obtained by means of ion-exchange with a glass substrate, for example, through a mask. When the aid of a computer is employed in creating the mask, as is commonly done in current practice, the mask is drawn and defined on a surface that is cut out into square image elements that are arranged in lines that are parallel to the axis of the coupler and in columns. If such image elements are used to design junctions that are not parallel to the axis of the coupler, then the edges of the resulting waveguides, which are usually deformed by a notching or crenelation due to the image elements used, display further asymmetrical crenelations which themselves can in turn introduce corresponding asymmetries into the propagation of the light through the waveguides that are obtained with such a mask.

Therefore, the goal of the present invention is to create an integrated optical coupler with one input port and $2^n$ output ports, such as 32, that has the uniformity in terms of the distribution of light power and the achromaticity that are required for applications in the telecommunications field.

SUMMARY OF THE INVENTION

This goal, as well as others that will become clear from a reading of the following description, is achieved through an integrated optical coupler that includes a plurality of essentially coplanar waveguides, each of which connects a single input port to one of $2^n$ output ports of the coupler, with the waveguides being arranged in two groups that are symmetrical in relation to the axis of the coupler and that consist of waveguide branches connected in a tree-like manner by n levels of Y-junctions, with at least the two output ports that are located farthest from the axis of the coupler being fed by waveguides that have no singularities and, between the first and the nth junction level of junctions, that further consist of points of inflection located outside the junctions. This coupler is noteworthy in that at east the two junctions in the (n−1)th level of the junctions that are located closest to the axis of the coupler have axes of symmetry that are parallel to the axis of symmetry of the coupler, with the axis of each of these junctions defining an axis of symmetry for two junctions in the nth junction level that are likewise parallel to the axis of the coupler, and also for the four output ports that they feed.

As will be seen below, the presence of junctions whose axes are parallel to the axis of the coupler, in the region of the coupler that is close to this axis, is favorable both in terms of improving the uniformity of the distribution of the light power among the output ports of the coupler and also in terms of reducing curvature losses.

Other characteristics and advantages of the present invention will become clear from a reading of the following description and through an examination of the attached drawing, in which the single FIGURE represents a waveguide pattern for an integrated optical coupler in accordance with the present invention.

DESCRIPTION OF THE DRAWINGS

FIG. 1 represents the waveguide of a 1 to 32 coupler in accordance with the present invention.

DETAILED DESCRIPTION OF THE INVENTION

For example, the pattern shown on the drawing is that of a coupler that has one input port $[E_1]$ and 32 output ports $[S_1]$ through $[S_{32}]$. As mentioned earlier, the coupler is implemented on a substrate [1] made, for example, of glass, by means of ion exchange through a mask that reveals the pattern, in accordance with a well-known method. Still as an example, with single-mode waveguides the substrate may have, parallel to the axis [X] of the coupler, a length [L] of, for example, 59 mm, and, located perpendicular to this axis, a width [l] of, for example, 12 mm. Thus, it is immediately apparent that the drawing of the waveguide pattern shown in the FIGURE is strongly anamorphic along the axis [X], with this anamorphosis having the advantage of more clearly revealing in the diagram the changes in the curvature of the guides.

It is also apparent that the coupler includes two groups of waveguides that are symmetrical in relation to the axis [X] of the coupler and that consists of waveguide branches that are connected in a tree-like manner by n (n=5) junction levels [11], [21] and [22], [31] to [34], [41] to [48], and [51] to [516], respectively.

The design of such a pattern begins with the size [p] of the outputs [$S_k$] of the guide, which for example can be 250 or 350 μm. Obviously, this size, together with the number of output ports, determine the crosswise space requirement [l] of the guide, which therefore is slightly greater than (n−1)p.

To limit curvature losses, the curvature should at all points remain greater than a given limit value, which may for example correspond to a radius of curvature of, for example, 100 mm.

Thus, if the profile of the waveguides that are located the farthest from the axis [X] is compared to the "S-shaped" profiles consisting of two arcs of a circle with a radius [R] in compliance with a minimum curvature condition, it can be shown that the following relationship exists between the size [p] and the radius of curvature [R]:

$$2R (1-\cos \alpha)=(n-1)p/2$$

when the arcs of a circle with equal length are selected.

In this relationship, $\alpha$ is the angle in relation to the axis [X] of the tangent at the point at which the two arcs of the circle are connected. When this relationship is solved for $\alpha$, the minimum longitudinal space requirement for the coupler is given by the following expression:

$$2R \sin \alpha$$

Having thus determined the envelope for all of the waveguides in the coupler and determined the position of the first junction [11], which is located at a distance 2R sin $\alpha$ from the centerline of the output [$S_k$], a straight guide line having length [$L_1$], which is at least 2 mm long and typically 5 mm, is added between the input port [$E_1$] and the junction [11]. This distance is conventionally dedicated to the re-centering of the propagation mode or modes for the light at the input of the coupler. It can also be seen that on the waveguides that are located the farthest from the axis [X], for example, the guides that contain the junctions [11] [21] [31] [41] and [51], not all of these junctions are parallel to the axis [X], and that therefore their position cannot be changed without violating the minimum curvature condition that is necessary to reduce curvature losses. Therefore, the guide must remain as designed, consistent with an S-shaped profile that complies with the condition imposed on the curvature, with the various junctions on the guide locating the only inflections of the guide that are necessary for the deployment of the tree-shaped pattern, in accordance with the teaching of the above-mentioned patent application. The waveguide that ends at the next port [$S_2$] is common with the preceding waveguide as far as the junction [51]. The curvilinear branch that runs from this junction to the port [$S_2$] is also designed in accordance with the teachings of this patent application.

However, the subsequent outputs [$S_3$] to [$S_{16}$], which are located successively closer to the axis [X] of the coupler, impose conditions that are less and less difficult to comply with, in terms of the maximum curvature that must not be exceeded. According to the invention, a benefit is derived from this relaxation of the constraint imposed by this condition in order to connect, through straight guide branches which therefore do not generate any curvature loss, certain junctions [41] to [43] in the (n−1)th junction level (which in this case is the same level) to certain junctions in the junction levels that surround this level.

Thus, the junction [41] is connected by a straight branch to the junction [52] in the 5th junction level, while the junction [42] is connected by similar branches to the junctions [53] and [54] of this 5th level. The same holds true for the branches that connect the junction [43] to the junction [32] in the preceding level and to the junctions [55] and [56] in the last level. In the drawing, the straight branches are shown by thicker lines.

It should be noted that, as a result of the release of the burden of the curvature constraint, the number of straight branches in the oblique junctions [41] [42] and [43] is respectively 1, 2, and 3. Therefore, this number increases as the location of the junction in question approaches the axis [X].

Thanks to these straight branches, there is a significant reduction in the curvature losses and in the mode misalignments that would otherwise have an unfavorable effect on the light power and on the distribution of this power among the output ports in question, i.e., ports [$S_2$] to [$S_{12}$].

Apart from the form of these straight branches, the course of the external waveguides described above in the coupler in accordance with the invention nevertheless remains generally consistent with that of the coupler guides described in the above-mentioned French patent application.

In accordance with the present invention, the course of the guides that are located closer to the axis [X] than the ones described above is clearly different from that of the corresponding guides in this latter coupler, in that the junctions [44] and [45], which are located closest to this axis in the (n−1)th junction level (n−1=4), have axes of symmetry [$X_1$] and [$X_2$], respectively, that are parallel to the axis [X] of the coupler. The axis [$X_1$] of the junction [44] also defines an axis of symmetry for the branches of the waveguides located downstream, and thus for the junctions [57] and [58] of the 5th junction level, and for the ports [$S_{13}$] to [$S_{17}$] that are fed by the junctions [44], [57], and [58]. The same holds true for the axis [$X_2$], in relation to the junctions [59] [510] and for the ports [$S_{17}$] to [$S_{20}$].

Thus, the junctions [44] [57] and [58], which are symmetrical and parallel to the axis [X] ensure complete equality, in terms of the division of the light power received, among their output branches. The waveguide branches that connected them include, in addition to curvilinear portions, straight portions on their input branches that encourage the re-centering of the modes. Because of the proximity of the axis [X], the curvatures of the curvilinear portions can be significantly smaller than the maximum tolerable curvature, thereby reducing curvature losses. As mentioned earlier, the division of the light power among the various ports [$S_{13}$] to [$S_{17}$] is advantageously no longer affected by the asymmetrical crenelation observed on the portions of the mask that define the junctions whose axes are oblique in relation to the axis [X].

The same observations obviously also apply to the junctions [45] [59] and [510], and to the branches of the waveguide located downstream of the junction [45], which is symmetrical with junction [44] in relation to the axis [X].

Thus, by combining the benefits derived from the advantageous positioning of the junctions [44] [45] [57] [58] [59] [510] and the straight branches of the waveguides located around the other junctions in the 4th junction level, it is possible to create a so-called "1-to-32" coupler in which the maximum power offset between the output ports remains under 0.7 dB, on average, in a set of such couplers, with the coupler simultaneously displaying the specified achromaticity in the two wavelength domains used in fiber-optic telecommunications, which are centered around 1310 and 1530 nm, respectively.

The junctions [44] [45], which are located parallel to the axis [X] of the coupler, are selected as a function of topological considerations, and particularly as a function of the option of centering these junctions on four ports, such as for example ports [$S_{13}$] to [$S_{16}$], and on the basis of their ability to comply with the limit curvature condition in spite of their so-called "horizontal" positioning.

Of course, the invention is not limited to the embodiment described herein and shown on the drawing, which has been provided purely as an example. Consequently, the teachings of the present invention, which have been described for a coupler with 32 outputs, could for example also be applied to couplers with 16 or 64 ports. In the latter case, the teachings of the present invention result in the positioning, parallel to the axis [X], of junctions in the (n−2)th junction level that are close to this axis.

Nor is the invention limited to the implementation of a coupler with single-mode waveguides. Obviously, it can be extended to couplers with multi-mode waveguides. Finally, the invention can also be applied to the creation of couplers whose output size [p] is different from the sizes cited herein for illustrative purposes, so that the invention can be adapted to various other connection techniques.

We claim:

1. An integrated optical coupler having one input port and $2^n$ output ports, said coupler comprising a plurality of essentially coplanar waveguides, each of said waveguides connecting the input port to one of the $2^n$ output ports, with said plurality of waveguides being arranged in two groups that are symmetrical in relation to the axis of the coupler and each waveguide having points of inflection, each of said waveguides comprising branches connected in a tree like manner by n levels of Y-junctions wherein the waveguides connecting at least two of the output ports that are located farthest from the axis of the coupler to the input port have no singularities, and between the first level and the nth level of the Y-junctions have points of inflection located outside the junctions, and wherein the junctions located along the waveguides connecting at least two of the output ports that are located farthest from the axis of the coupler to the input port have axes of symmetry which are not parallel to the axis of the coupler and wherein the waveguides connecting at least two of the output ports that are located closest to the axis of the coupler have junctions in the (n−1)th level having axes of symmetry parallel to the axis of the coupler, with the axis of each of these junctions defining an axis of symmetry for two junctions in the nth junction level that are likewise parallel to the axis of the coupler, and also for the four output ports that they feed.

2. The coupler in accordance with claim 1 wherein the number of output ports of the coupler is 16, 32, or 64.

3. The coupler in accordance with claim 1, wherein the waveguides are implemented by means of ion exchanges in a substrate.

4. The coupler in accordance with claim 1, wherein the junctions of the (n−1)th level of the Y-junctions that are not parallel to the axis of the coupler are connected to the junctions in the nth level and the (n−2)th level by groups of waveguide branches that include a number of straight branches, the number of straight branches increasing when the distance between the junction and the axis of the coupler decreases.

* * * * *